UNITED STATES PATENT OFFICE.

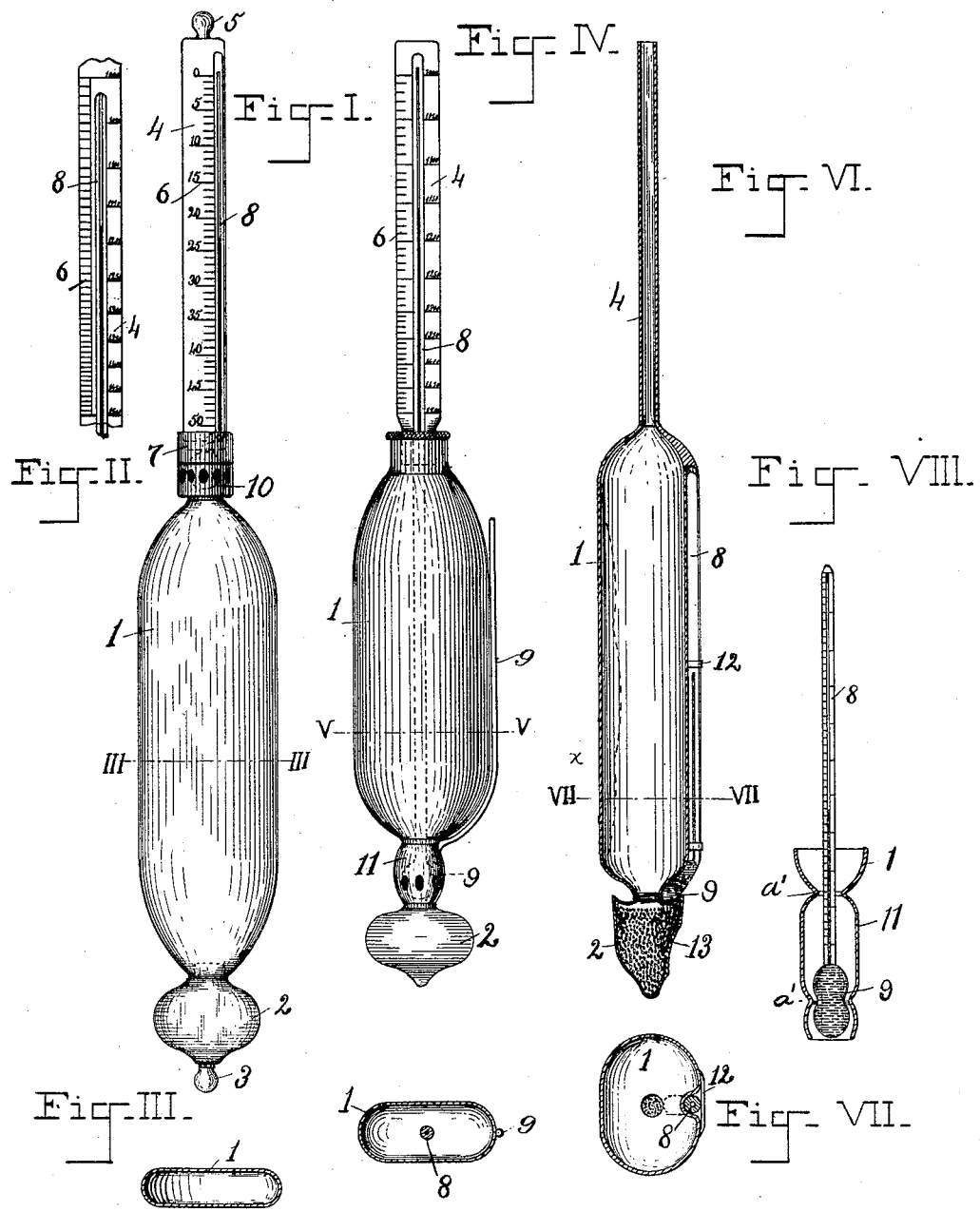

WALTON C. TIFFANY, OF NEW YORK, N. Y., ASSIGNOR TO THE TIFFANY CHEMICAL COMPANY, OF NEW YORK.

HYDROMETER.

SPECIFICATION forming part of Letters Patent No. 480,480, dated August 9, 1892.

Application filed June 1, 1891. Serial No. 394,738. (No model.)

*To all whom it may concern:*

Be it known that I, WALTON C. TIFFANY, a citizen of the United States, residing in the city, county, and State of New York, have invented certain new and useful Improvements in Hydrometers, of which the following is a specification.

My invention specially relates to hydrometers called "barkometers," which are customarily used by leather manufacturers for testing the specific gravity of tannin and other extracts. Heretofore similar instruments have customarily been made entirely of glass, usually blown or molded in a single piece. The fragile nature of this material has rendered such instruments previously made of short endurance and expensive to replace, but the material was supposed to be the best known, owing to the fact that it changed but little, if any, under the action of the atmosphere and the liquid tested, and the scale thereon or showing therethrough would consequently remain correct, easily discernable, and durable for a greater length of time than if any other material were employed.

My invention makes it possible to use metal or metal and glass or rubber in the manufacture of hydrometers providing ready means whereby the instrument can be kept always to a correct register as well as adjusted to the varying conditions of liquid to be tested, and where suitable metal predominates in the construction the liability to breakage is less, while the glass parts, if any, are less expensive to replace.

I will first describe my invention with reference to the accompanying drawings and then point out in the claims the novel features.

In said drawings, Figure I is an elevation of the preferred form of my invention. Fig. II is a partial elevation showing the scale and stem in face view. Fig. III is a sectional elevation on the line III III, Fig. I. Fig. IV is an elevation of a modified form of the invention. Fig. V is a sectional view on the line V V, Fig. IV. Fig. VI is a sectional elevation showing another modification. Fig. VII is a sectional view on the line VII VII, Fig. VI. Fig. VIII is a sectional elevation of a further modification.

Referring to Fig. I, 1 is a large hollow float, preferably of metal; but certain features of my invention may be employed with a float of glass, rubber, or other material. The metal preferably employed is a light one, such as aluminium, aluminium-bronze, or similar non-corrosible metal.

2 is the weight-bulb, which is also preferably of metal and which, together with the float-bulb 1, has a flattened cross-section, such as shown in Fig. III, so as to retard the horizontal rotation of the instrument in the liquid. Either the float-bulb or the weight-bulb, or both, may be flattened, as shown. If the instrument is of glass, the flattening is readily made while the material is soft, when forming the tube. The weight-bulb 2 is screwed or otherwise adjustably attached to the float-bulb 1, and it has a removable plug at point of attachment or stopper 3 in the bottom, so that the weight-bulb may be removed and others of different sizes or shapes substituted; or the top or bottom plugs may be removed and the weight which the weight-bulb contains and which may be in semi-liquid form, as mercury, or varied as required, as by shot or other well-known weights, according to the use to which the instrument is put or according to the weight of the instrument or stem thereof. The stem is shown at 4. It is preferably of glass, though in some forms it may be made of metal. It is hollow and it is open at top and there closable by a removable plug 5 or by wax or similar material.

The scale 6, which may be a combination of specific gravity, temperature, correction-scale, or any of them, is printed on a piece of paper, which may be inserted and removed through the top or bottom of the stem, or marked thereon.

Scales of varying degrees of fineness or varying lengths may be applied, according to the uses to which the instrument is being put.

The stem may be made of various lengths, the longer showing wider-spaced and more easily-read divisions or markings. Its base-piece 7 is preferably of metal and is screwed or otherwise detachably connected to the top of the float-bulb 1, so that the stem and base-piece may be removed at pleasure for the affixing or insertion of another stem to the float-bulb, such stem being of any desired length, dimensions, or readings and the weight adjusted thereto.

The thermometer-tube 8 is supported in the stem 4, its bulb 9 resting or fixed in the base-piece 7, which is preferably, as shown at 10, with openings to enable the liquid to reach and affect the exposed part of the bulb of the thermometer. Preferably the base-piece 7 is made in two pieces, which, if a temperature-bulb is to be held for convenience of cleaning and attaching, are screwed or otherwise attached together, so that on separation of the same the thermometer is in touch with the scales or may be removed from that end.

With an instrument such as described above the maker adjusts the weight in the bulb 2 according to the weight of the stem to be employed, and he uses the stem which will best suit the character of the work desired, or the user can affix other stems adapted to the float-bulb and adjust the weights or scales. The adjustment for temperature-scale is such that when the instrument is in the liquid the latter will more than cover the apertures 10 in the base-piece 7, indicating on the scale 6 the specific gravity of the liquid and at the same time affecting the thermometer, so that the latter will indicate above the liquor tested, and so is easily seen undimmed by the liquor and also the correction which is to be made, as is usual to indicate the temperature allowance for any liquor to correct the specific-gravity indication into conformity with the normal standard of 60° Fahrenheit.

In Figs. IV and V, I have illustrated a modification wherein the thermometer-tube 8 runs completely to the bottom of the instrument used where temperature of greater depth is desired, its bulb 9 being placed in a metallic chamber 11, immediately above the removable weight-bulb 2, or carried up upon the outside of the float-bulb 1. The lower portion 2 is removable at pleasure to adjust the weight of the instrument through a plugged aperture in its top or bottom.

In the form of the instrument shown in Fig. VI the stems 4, which bear the specific-gravity or other scales, are also detachable or may be fixed, and the thermometer-tube 8 is fixed to the outside of the float-bulb, being sunk into a groove therein and held in any convenient way, as by straps 12, as shown in cross-section in Fig. VII. To prevent the slanting of the instrument from the perpendicular when in the liquid, the removable weight-bulb 3 has a hollow portion 13 on one side, which counteracts the weight of the thermometer 8 and its bulb, or the float-bulb is made heavier on opposite side, as indicated in dotted lines. The weight of the bulb 2 may be changed by removing it from the float-bulb or by pouring the weight in or out through the float 1 and stem 4, a passage being provided all the way through, or the thermometer-bulb may be inclosed next above the weight-bulb, its stem running up outside, the temperature-bulb being exposed to the liquor and so adjusted that the weight-bulb can be screwed up to tighten it in place.

In the form of the invention shown in Fig. VIII, which may be made of glass or metal, the thermometer-bulb 9 is supported by an enlarged base-piece 11, which forms part of the float 1, and the weight, if inserted or adjusted through the opening in top of the float or stem, is caused or adapted to fill, more or less, the space above the thermometer-bulb in the base-piece 11, and the latter is then plugged at a', Fig. VIII, with any convenient stopper, which may be of fiber, wax, or cement, thus keeping the weight at lower end of the instrument, and thereby keeping the instrument perpendicular in the liquor.

In making hydrometers it is often the case that adjusted weights are attached to sides of the float-bulb, putting them out of plumb, or, if detached by heat or jarring, causing breakage to the bulb.

Having thus described my invention, the following is what I claim as new therein and desire to secure by Letters Patent:

1. In a hydrometer, the float-bulb or other submerged part having a flattened cross-section, substantially as set forth.

2. In a hydrometer, the combination of a hollow stem, a removable scale within the stem, and a stopper by which the stem is closed, substantially as set forth.

3. In a hydrometer, the combination of the hollow stem having an open bottom and adapted to carry a scale, the float-bulb, and the thermometer passing through the float-bulb and through the open bottom and detachable from the stem, substantially as set forth.

4. In a hydrometer, the combination of the float-bulb, the stem having a scale, the thermometer in said stem, and the base of said thermometer's stem located above the float-bulb and perforated or so fixed as to allow temperature influence or access of liquid to said bulb, substantially as set forth.

5. In a hydrometer, the combination of a scale-bearing float-bulb, a weight-bulb adapted to receive removable weights, one or both of said parts being flattened, and an open-top closable scale-bearing stem, substantially as set forth.

6. In a hydrometer, the combination of a float-bulb, a weight-bulb adapted to receive removable weights, a closable open-top stem, and suitable thermometer and correction scales, substantially as set forth.

7. In a hydrometer partially or wholly of metal, the combination of the scale-bearing float-bulb, a weight-bulb, one or both of said parts being flattened, as described, and open closable stems having temperature-indicator attachments, substantially as set forth.

8. In a hydrometer wholly or partly of glass or metal, a weight end arranged for easy adjustment and confinement of weights, combined with a scale-bearing flattened or cylindrical float-bulb and an open-top stem, substantially as set forth and shown.

WALTON C. TIFFANY.

Witnesses:
C. PFEIFFER,
M. V. BIDGOOD.